(12) United States Patent
Soma et al.

(10) Patent No.: US 11,570,707 B2
(45) Date of Patent: Jan. 31, 2023

(54) SYSTEMS AND METHODS FOR COMPARISON AND SCORING OF NETWORK ACCESS POINTS

(71) Applicant: Dell Products L.P., Round Rock, TX (US)

(72) Inventors: Dileep Kumar Soma, Round Rock, TX (US); Vivek Viswanathan Iyer, Austin, TX (US)

(73) Assignee: Dell Products L.P., Round Rock, TX (US)

(*) Notice: Subject to any disclaimer, the term of this patent is extended or adjusted under 35 U.S.C. 154(b) by 131 days.

(21) Appl. No.: 17/146,140

(22) Filed: Jan. 11, 2021

(65) Prior Publication Data
US 2022/0225228 A1 Jul. 14, 2022

(51) Int. Cl.
*H04W 48/20* (2009.01)
*H04W 28/02* (2009.01)
*H04W 24/08* (2009.01)

(52) U.S. Cl.
CPC ........... *H04W 48/20* (2013.01); *H04W 24/08* (2013.01); *H04W 28/0205* (2013.01)

(58) Field of Classification Search
None
See application file for complete search history.

(56) References Cited

U.S. PATENT DOCUMENTS

| | | | | | |
|---|---|---|---|---|---|
| 5,754,959 | A | * | 5/1998 | Ueno | H04W 36/365 455/437 |
| 5,796,722 | A | * | 8/1998 | Kotzin | H04W 28/26 370/332 |
| 5,898,681 | A | * | 4/1999 | Dutta | H04B 7/18539 370/347 |
| 5,978,359 | A | * | 11/1999 | Caldara | H04L 49/101 370/414 |
| 6,073,025 | A | * | 6/2000 | Chheda | H04W 52/40 370/332 |

(Continued)

FOREIGN PATENT DOCUMENTS

| | | | | |
|---|---|---|---|---|
| CA | 2734138 A1 | * | 9/2012 | ......... H04L 41/5022 |
| CN | 103338499 A | * | 10/2013 | |
| CN | 110876147 A | * | 3/2020 | ............. H04L 65/80 |

*Primary Examiner* — Christopher T Wyllie
(74) *Attorney, Agent, or Firm* — Jackson Walker L.L.P.

(57) ABSTRACT

An information handling system may include a processor, a network interface, and non-transitory computer-readable media having stored thereon an agent comprising a program of instructions, the agent configured to, when read and executed by the processor: perform background scanning of traffic associated with a plurality of network access points, in order to collect traffic information associated with the information handling system and traffic information and capabilities associated with the plurality of network access points; score each network access point of the plurality of network access points based on the traffic information associated with the information handling system and traffic information and capabilities associated with the plurality of network access points; compare scores for each of the plurality of network access points to determine a selected network access point; and cause the network interface to connect to the selected network access point.

12 Claims, 2 Drawing Sheets

(56) References Cited

U.S. PATENT DOCUMENTS

| | | | | |
|---|---|---|---|---|
| 6,208,644 B1* | 3/2001 | Pannell | H04Q 11/0478 | 370/422 |
| 6,385,449 B2* | 5/2002 | Eriksson | H04W 28/0808 | 455/450 |
| 6,574,474 B1* | 6/2003 | Nielsen | H04W 48/20 | 455/433 |
| 6,574,477 B1* | 6/2003 | Rathunde | H04W 28/0808 | 455/561 |
| 6,581,104 B1* | 6/2003 | Bereiter | H04Q 3/62 | 709/213 |
| 6,590,861 B1* | 7/2003 | Vepa | H04L 12/4691 | 370/230 |
| 6,650,621 B1* | 11/2003 | Maki-Kullas | H04L 45/00 | 370/392 |
| 6,667,975 B1* | 12/2003 | DeJager | H04L 49/9094 | 718/103 |
| 6,701,150 B1* | 3/2004 | Huang | H04W 48/20 | 370/332 |
| 6,711,159 B1* | 3/2004 | Grabelsky | H04L 67/1001 | 370/465 |
| 6,717,950 B2* | 4/2004 | Lui | H04L 45/12 | 370/408 |
| 6,728,961 B1* | 4/2004 | Velasco | G06F 9/505 | 714/11 |
| 6,788,692 B1* | 9/2004 | Boudreau | H04L 47/125 | 370/465 |
| 6,789,125 B1* | 9/2004 | Aviani | H04L 67/1029 | 709/238 |
| 6,799,210 B1* | 9/2004 | Gentry | H04L 65/103 | 709/227 |
| 6,810,018 B2* | 10/2004 | Paranchych | H04W 28/0808 | 370/335 |
| 7,215,661 B2* | 5/2007 | Backes | H04W 64/00 | 370/338 |
| 7,480,264 B1* | 1/2009 | Duo | H04L 47/10 | 370/230.1 |
| 7,818,014 B2* | 10/2010 | Takizawa | H04W 28/0804 | 455/442 |
| 7,907,562 B2* | 3/2011 | Murty | H04W 48/02 | 455/421 |
| 8,014,277 B2* | 9/2011 | Julian | H04W 72/04 | 370/229 |
| 8,023,452 B2* | 9/2011 | Douglas | H04W 24/02 | 370/328 |
| 8,036,163 B2* | 10/2011 | Kobayashi | H04W 76/10 | 370/328 |
| 8,072,952 B2* | 12/2011 | Aragon | H04W 36/22 | 370/338 |
| 8,116,275 B2* | 2/2012 | Matta | H04W 48/12 | 455/434 |
| 8,150,357 B2* | 4/2012 | Aragon | H04B 17/318 | 455/213 |
| 8,155,058 B2* | 4/2012 | Iyer | H04W 48/06 | 370/328 |
| 8,161,278 B2* | 4/2012 | Harkins | H04L 63/045 | 380/248 |
| 8,169,900 B2* | 5/2012 | Castro | H04L 47/70 | 370/252 |
| 8,218,449 B2* | 7/2012 | Taylor | H04W 24/06 | 370/252 |
| 8,223,732 B2* | 7/2012 | Li | H04W 48/20 | 370/328 |
| 8,238,298 B2* | 8/2012 | Zhao | H04W 28/16 | 370/332 |
| 8,238,942 B2* | 8/2012 | Gast | G01S 5/0205 | 455/67.14 |
| 8,340,110 B2* | 12/2012 | Gast | H04W 28/18 | 370/395.42 |
| 8,352,550 B2* | 1/2013 | Boudreau | H04L 65/60 | 709/204 |
| 8,391,199 B2* | 3/2013 | Sampath | H04W 52/243 | 370/332 |
| 8,406,196 B2* | 3/2013 | Lai | H04L 43/0817 | 370/235 |
| 8,451,735 B2* | 5/2013 | Li | H04L 47/125 | 370/236 |
| 8,457,031 B2* | 6/2013 | Matta | H04W 24/00 | 370/312 |
| 8,516,095 B2* | 8/2013 | Eisener | H04W 8/186 | 709/224 |
| 8,626,867 B2* | 1/2014 | Boudreau | H04L 67/04 | 709/224 |
| 8,638,762 B2* | 1/2014 | Tiwari | H04W 12/125 | 713/160 |
| 8,670,383 B2* | 3/2014 | Gast | H04W 72/1242 | 370/312 |
| 8,699,418 B2* | 4/2014 | Iyer | H04W 60/00 | 370/328 |
| 8,792,349 B2* | 7/2014 | Sarkar | H04W 28/0812 | 455/434 |
| 8,818,322 B2* | 8/2014 | Murphy | H04W 12/06 | 455/562.1 |
| 8,832,185 B2* | 9/2014 | Murphy | G06F 15/17306 | 726/7 |
| 8,885,557 B2* | 11/2014 | Walke | H04W 12/03 | 713/153 |
| 8,902,904 B2* | 12/2014 | Gast | H04L 12/4679 | 455/435.2 |
| 8,914,009 B2* | 12/2014 | Murphy | H04L 67/10 | 455/418 |
| 8,918,114 B2* | 12/2014 | Gupta | H04W 72/0406 | 455/448 |
| 8,942,161 B2* | 1/2015 | Gupta | H04W 72/08 | 370/332 |
| 8,964,747 B2* | 2/2015 | Albert Hu | H04L 63/02 | 370/469 |
| 8,965,992 B2* | 2/2015 | Boudreau | H04W 12/02 | 709/224 |
| 8,966,018 B2* | 2/2015 | Bugwadia | H04L 41/0869 | 709/223 |
| 8,978,105 B2* | 3/2015 | Gast | H04W 48/14 | 726/4 |
| 9,021,059 B2* | 4/2015 | Runstedler | H04L 67/56 | 709/206 |
| 9,071,993 B1* | 6/2015 | Duo | H04W 24/02 | |
| 9,191,799 B2* | 11/2015 | Murphy | H04W 8/14 | |
| 9,204,428 B2* | 12/2015 | Gupta | H04W 72/0406 | |
| 9,258,702 B2* | 2/2016 | Murphy | H04W 76/12 | |
| 9,270,682 B2* | 2/2016 | Boudreau | H04L 51/58 | |
| 9,294,883 B2* | 3/2016 | Kneckt | H04W 4/06 | |
| 9,407,686 B2* | 8/2016 | Runstedler | H04L 67/06 | |
| 9,432,848 B2* | 8/2016 | Iyer | H04W 12/122 | |
| 9,503,971 B2* | 11/2016 | Umetsu | H04W 48/20 | |
| 9,538,381 B2* | 1/2017 | Caldwell | H04W 12/082 | |
| 9,913,193 B2* | 3/2018 | Ho | H04W 36/08 | |
| 10,079,912 B2* | 9/2018 | Boudreau | G06F 8/61 | |
| 10,129,751 B2* | 11/2018 | Singh | H04W 12/084 | |
| 10,820,266 B2* | 10/2020 | Bhartia | H04W 28/0812 | |
| 10,834,652 B2* | 11/2020 | Bray | H04L 41/12 | |
| 2002/0110105 A1* | 8/2002 | Awater | H04W 36/22 | 370/395.21 |
| 2003/0050068 A1* | 3/2003 | Woxberg | H04W 28/26 | 455/450 |
| 2003/0109254 A1* | 6/2003 | Motegi | H04W 24/02 | 455/435.1 |
| 2003/0134642 A1* | 7/2003 | Kostic | H04L 5/023 | 455/450 |
| 2003/0139197 A1* | 7/2003 | Kostic | H04L 47/122 | 455/500 |
| 2004/0053624 A1* | 3/2004 | Frank | H04L 63/10 | 455/453 |
| 2004/0063455 A1* | 4/2004 | Eran | H04W 92/20 | 455/525 |
| 2004/0098586 A1* | 5/2004 | Rebo | H04L 63/162 | 713/169 |
| 2004/0121749 A1* | 6/2004 | Cui | H04W 72/085 | 455/418 |

(56) References Cited

U.S. PATENT DOCUMENTS

| | | | |
|---|---|---|---|
| 2004/0142691 A1* | 7/2004 | Jollota | H04W 36/08 |
| | | | 455/436 |
| 2004/0246922 A1* | 12/2004 | Ruan | H04W 48/20 |
| | | | 370/331 |
| 2006/0089122 A1* | 4/2006 | Zavalkovsky | H04W 48/02 |
| | | | 455/410 |
| 2008/0085712 A1* | 4/2008 | Han | H04W 36/04 |
| | | | 455/440 |
| 2014/0313901 A1* | 10/2014 | Yacovitch | H04W 28/0808 |
| | | | 370/236 |
| 2017/0142017 A1* | 5/2017 | Davis | H04L 47/24 |
| 2017/0181070 A1* | 6/2017 | Gupta | H04W 48/18 |
| 2022/0224449 A1* | 7/2022 | Shrestha | H04L 1/1825 |
| 2022/0225228 A1* | 7/2022 | Soma | H04W 24/02 |

* cited by examiner

SYSTEMS AND METHODS FOR COMPARISON AND SCORING OF NETWORK ACCESS POINTS

TECHNICAL FIELD

The present disclosure relates in general to network configuration, and more particularly to a system and method for configuration of a network requiring little or no user input.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users are increasingly implementing networks (e.g., local areas networks or LANs) that utilize wireless transmissions (e.g., wireless fidelity or "Wi-Fi") and wire-line transmissions in their homes and/or businesses. For example, users may implement a home or business network including an information handling system, one or more wireless-capable network devices, and a wireless access point communicatively coupled to the information handling system and network devices. Such a network may allow an information handling system (or a user thereof) to communicate with the one or more network devices via the wireless access point or vice versa.

Traditionally, an information handling system selects a wireless access point from a plurality of wireless access points based on the relative signal strengths of the wireless access points, which may effectively be a proxy for the relative physical proximity of the wireless access points to the information handling system. More recently, newer approaches have used an access point scoring mechanism based on access point environment information communicated from the wireless access points. However, such approach may be less than optimal for a number of reasons. For example, not all access points may provide environmental information due to a wireless access point not supporting the broadcast of such information or such feature being disabled on a wireless access point. Scoring an access point without the unknown loading information may lead to erroneous scoring, and scoring access points that report and access points that do not report environmental information may lead to inaccurate ranking of access points.

Further, access points have the capability to prioritize applications and send high priority traffic. Access points may broadcast loading information in terms of number of users and channel busy time if such feature is supported and enabled on a wireless access point, but not the type of traffic. However, for accurate scoring, a wireless access point should be scored based on the prioritized traffic of the access point and the traffic of the information handling system itself.

SUMMARY

In accordance with the teachings of the present disclosure, the disadvantages and problems associated with comparison and scoring of network access points by an information handling system may be reduced or eliminated.

In accordance with embodiments of the present disclosure, an information handling system may include a processor, a network interface, and non-transitory computer-readable media having stored thereon an agent comprising a program of instructions, the agent configured to, when read and executed by the processor: perform background scanning of traffic associated with a plurality of network access points, in order to collect traffic information associated with the information handling system and traffic information and capabilities associated with the plurality of network access points; score each network access point of the plurality of network access points based on the traffic information associated with the information handling system and traffic information and capabilities associated with the plurality of network access points; compare scores for each of the plurality of network access points to determine a selected network access point; and cause the network interface to connect to the selected network access point.

In accordance with these and other embodiments of the present disclosure, a method may include: performing background scanning of traffic associated with a plurality of network access points, in order to collect traffic information associated with an information handling system and traffic information and capabilities associated with the plurality of network access points; scoring each network access point of the plurality of network access points based on the traffic information associated with the information handling system and traffic information and capabilities associated with the plurality of network access points; comparing scores for each of the plurality of network access points to determine a selected network access point; and causing a network interface of the information handling system to connect to the selected network access point.

In accordance with these and other embodiments of the present disclosure, an article of manufacture comprising may include a non-transitory computer-readable medium and computer-executable instructions carried on the computer-readable medium, the instructions readable by a processing device, the instructions, when read and executed, for causing the processing device to: perform background scanning of traffic associated with a plurality of network access points, in order to collect traffic information associated with an information handling system and traffic information and capabilities associated with the plurality of network access points; score each network access point of the plurality of network access points based on the traffic information associated with the information handling system and traffic information and capabilities associated with the plurality of network access points; compare scores for each of the plurality of network access points to determine a selected network access point; and cause a network interface of the information handling system to connect to the selected network access point.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
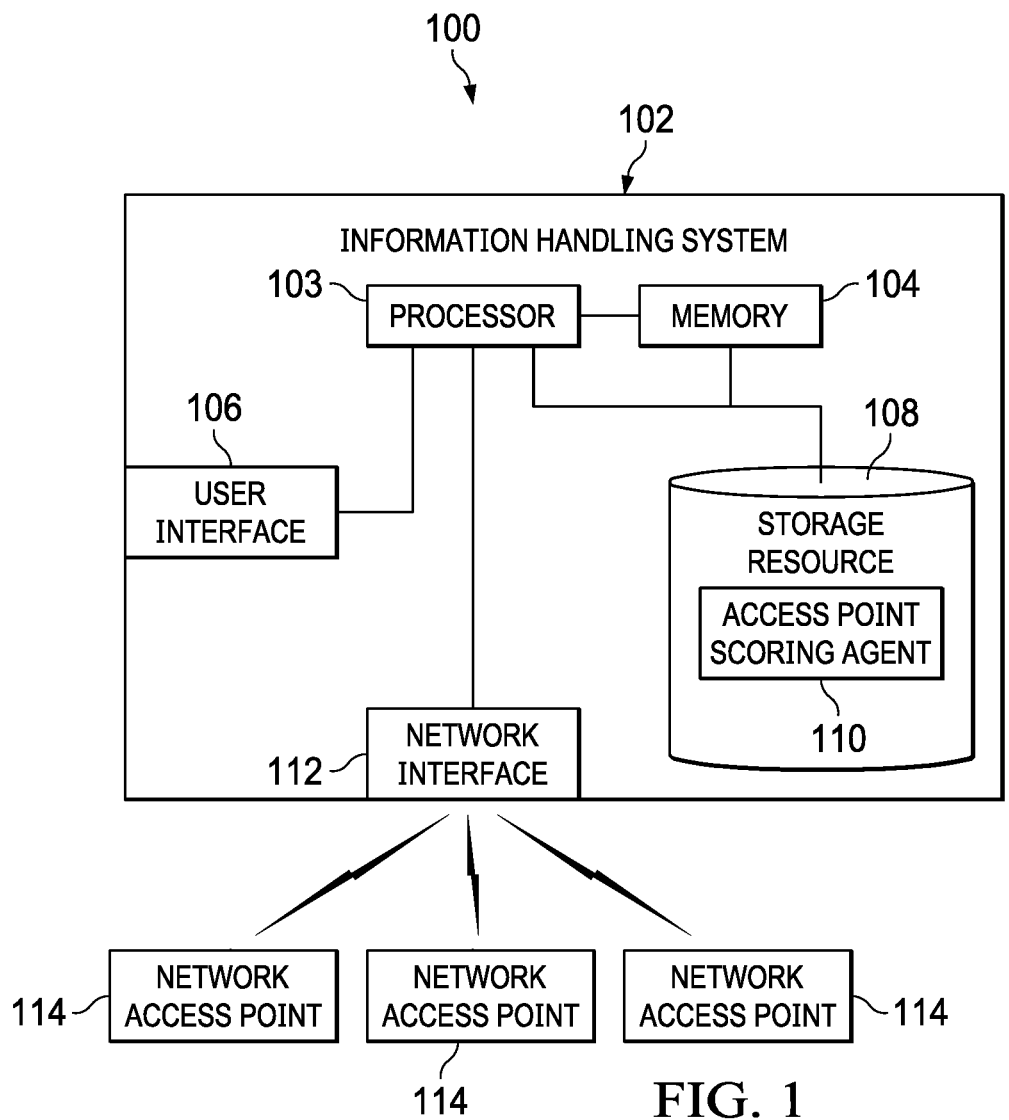
FIG. 1 illustrates a block diagram of an example network system, in accordance with an embodiment of the present disclosure.
Figure 2:
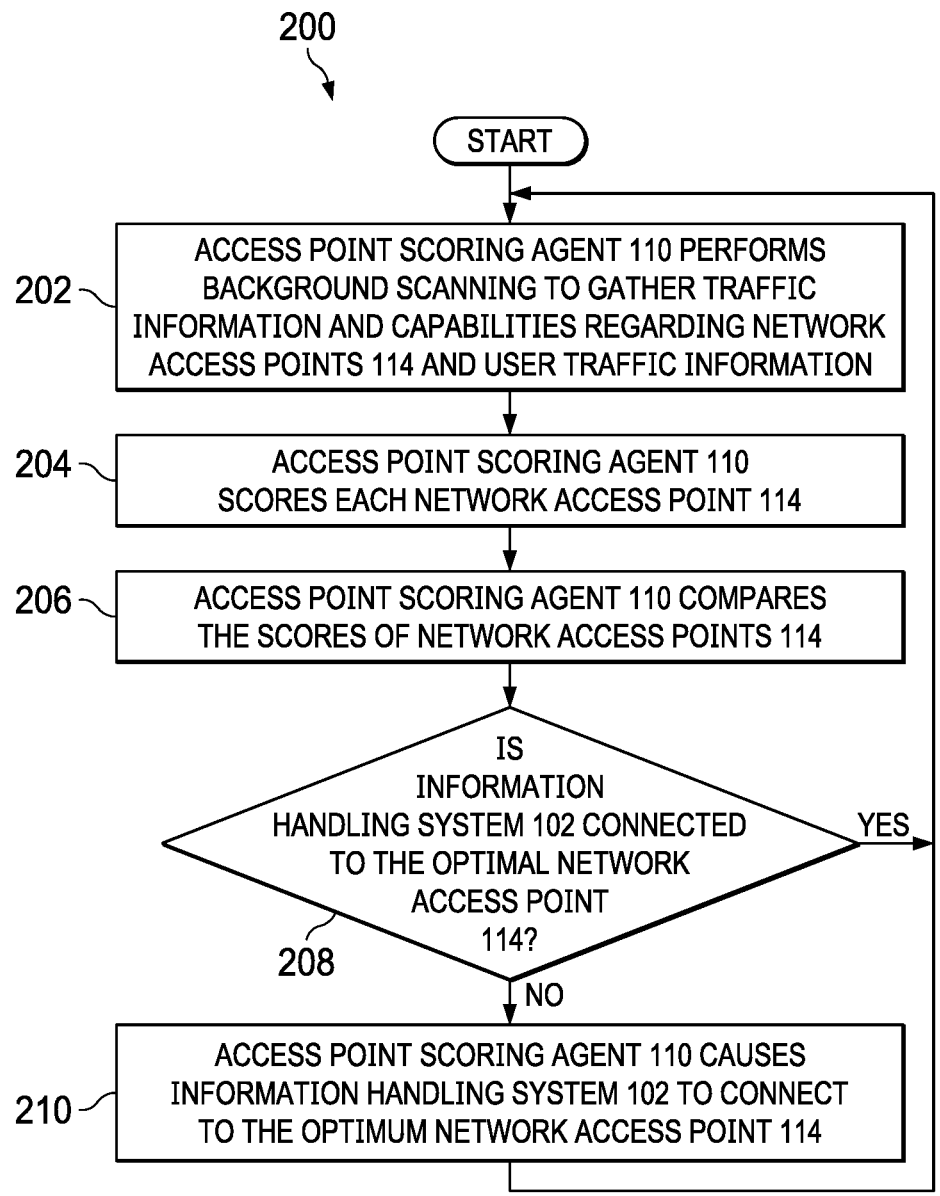
FIG. 2 illustrates a flow chart of an example method for comparison and scoring of network access points, in accordance with certain embodiments of the present disclosure.

Preferred embodiments and their advantages are best understood by reference to FIGS. 1 and 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10 baseT, 100 baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infra-red, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example network system 100, in accordance with an embodiment of the present disclosure. As depicted, system 100 may include an information handling system 102 and a plurality of network access points 114.

Information handling system 102 may generally be operable to receive data from, and/or transmit data to, one or more devices via one or more network access points 114. For example, information handling system 102 may be a personal computer adapted for home use. As another example, information handling system 102 may be a personal computer adapted for business use. As shown in FIG. 1, information handling system 102 may include a processor 103, a memory 104 communicatively coupled to processor 103, a user interface 106, a local storage resource 108, and a network interface 112.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Local storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Local storage resource 108 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1, storage resource 108 may have stored thereon access point scoring agent 110.

Access point scoring agent 110 may comprise any suitable program of executable instructions configured to, when loaded into memory 104 and executed by processor 103, perform comparison and scoring of network access points 114, as described in greater detail below. In some embodiments, access point scoring agent 110 may comprise an application program that runs on top of an operating system of information handling system 102. In other embodiments, access point scoring agent 110 may comprise a driver, library, or other component of such an operating system.

Network interface 112 may include any suitable system, apparatus, or device operable to serve as an interface between information handling system 102 and network access point 114. Network interface 112 may enable information handling system 102 to communicate via network access point 114 using any suitable transmission protocol (e.g., TCP/IP) and/or standard (e.g., IEEE 802.11, Wi-Fi). In certain embodiments, network interface 112 may include a network interface card (NIC). In the same or alternative embodiments, network interface 112 may be configured to communicate with network access point 114 via wireless transmissions. In the same or alternative embodiments, network interface 112 may provide physical access to a networking medium and/or provide a low-level addressing system (e.g., through the use of Media Access Control addresses). In certain embodiments, network interface 112 may include a buffer for storing packets received from network access point 114 and/or a controller configured to process packets received by network access point 114.

A network access point 114 may include any system, device or apparatus operable to communicatively couple one or more devices together to form a network. Network access point 114 may be a part of a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). For example, network access point 114 may be configured to communicate with other devices via wireless transmissions, and thus may communicatively couple a plurality of wireless communication devices together to form a wireless network. Network access point 114 may also be configured to communicate to one or more devices via wire-line transmissions, and thus may relay data among wireless devices and wired devices. Network access point 114 may be configured to communicate with other devices via any suitable communication protocol (e.g., TCP/IP) and/or standard (e.g., IEEE 802.11, Wi-Fi).

Although FIG. 1 depicts system 100 having three network access points 114, it is understood that system 100 may include any suitable number and types of network access points 114.

FIG. 2 illustrates a flow chart of an example method 200 for comparison and scoring of network access points 114, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, access point scoring agent 110 may perform background scanning to gather traffic information and capabilities regarding network access points 114 and user traffic information. Although each packet from the various network access points 114 may be encrypted, metadata in the packets (e.g., differentiated services code point tags in the Internet Protocol layer) may provide sufficient information regarding the type of traffic being routed within the packets. Thus, by performing such background scanning, access point scoring agent 110 may gather information regarding a traffic load for each channel of the various network access points 114 (e.g., even if one or more network access points 114 do not support or are not enabled to communicate such load information) and the type of traffic routed by each network access point 114.

At step 204, access point scoring agent 110 may score each network access point 114. Based on the number of users and the payload of an application, access point scoring agent 110 may calculate throughput information for each network access point 114 in accordance with the well-known Bianchi's model or other suitable approach. Such model may take into consideration packet size and user information. Because Bianchi's model does not take signal strength into consideration, access point scoring agent 110 may generate a fair score for each network access point 114 in accordance with the formula:

$$\text{Score} = \frac{w_1 * (\text{scaled signal strength}) + w_2 * (\text{scaled Bianchi throughput})}{w_1 + w_2} * 100$$

where $w_1$ is a current weight allocated to signal strength in access point scoring and $w_2$ is a combined weight of factors in the scoring mechanism.

The foregoing formula provides scoring of each network access point 114 without considering a prioritization factor of each network access point 114. When traffic of network access points 114 is fully estimated and prioritization factors are applied on network access points 114, access point scoring agent 110 may generate a fair score for each network access point 114 in accordance with the formula:

$$Score'=Score+\gamma E(U)-E(AP)$$

where $\gamma$ is a design parameter based on a prioritization engine of the network access point 114 being scored, E(U) is an average traffic priority at information handling system 102, and E(U) is an average traffic priority at the network access point 114 being scored.

At step 206, access point scoring agent 110 may compare the score for each network access point 114. At step 208, access point scoring agent 110 may determine, based on the comparison, if information handling system 102 is connected to the optimal network access point 114. If information handling system 102 is connected to the optimal network access point 114, method 200 may proceed again to step 202. If information handling system 102 is not connected to the optimum network access point 114, method 200 may proceed to step 210, at which access point scoring agent 110 may cause information handling system 102 to connect to the optimum network access point 114.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system, comprising:
   a processor;
   a network interface; and
   non-transitory computer-readable media having stored thereon an agent comprising a program of instructions, the agent configured to, when read and executed by the processor:
   perform background scanning of traffic associated with a plurality of network access points, in order to collect traffic information associated with the information handling system and traffic information and capabilities associated with the plurality of network access points;
   score each network access point of the plurality of network access points based on the traffic information associated with the information handling system and traffic information and capabilities associated with the plurality of network access points, a signal strength and a throughput of such network access point, and on an average traffic priority of the information handling system;
   compare scores for each of the plurality of network access points to determine a selected network access point; and
   cause the network interface to connect to the selected network access point.

2. The information handling system of claim 1, wherein the network interface is a wireless network interface and the network interface connects to the selected network access point via wireless transmissions.

3. The information handling system of claim 1, wherein the score of each network access point is further based on a prioritization factor associated with such network access point.

4. The information handling system of claim 1, wherein the score of each network access point is further based on an average traffic priority of such network access point.

5. A method comprising:
performing background scanning of traffic associated with a plurality of network access points, in order to collect traffic information associated with an information handling system and traffic information and capabilities associated with the plurality of network access points;
scoring each network access point of the plurality of network access points based on the traffic information associated with the information handling system and traffic information and capabilities associated with the plurality of network access points, a signal strength and a throughput of such network access point, and on an average traffic priority of the information handling system;
comparing scores for each of the plurality of network access points to determine a selected network access point; and
causing a network interface of the information handling system to connect to the selected network access point.

6. The method of claim 5, wherein the network interface is a wireless network interface and the network interface connects to the selected network access point via wireless transmissions.

7. The method of claim 5, wherein the score of each network access point is further based on a prioritization factor associated with such network access point.

8. The method of claim 5, wherein the score of each network access point is further based on an average traffic priority of such network access point.

9. An article of manufacture comprising:
a non-transitory computer-readable medium; and
computer-executable instructions carried on the computer-readable medium, the instructions readable by a processing device, the instructions, when read and executed, for causing the processing device to:
perform background scanning of traffic associated with a plurality of network access points, in order to collect traffic information associated with an information handling system and traffic information and capabilities associated with the plurality of network access points;
score each network access point of the plurality of network access points based on the traffic information associated with the information handling system and traffic information and capabilities associated with the plurality of network access points, a signal strength and a throughput of such network access point, and on an average traffic priority of the information handling system;
compare scores for each of the plurality of network access points to determine a selected network access point; and
cause a network interface of the information handling system to connect to the selected network access point.

10. The article of claim 9, wherein the network interface is a wireless network interface and the network interface connects to the selected network access point via wireless transmissions.

11. The article of claim 9, wherein the score of each network access point is further based on a prioritization factor associated with such network access point.

12. The article of claim 9, wherein the score of each network access point is further based on an average traffic priority of such network access point.

* * * * *